Dec. 4, 1934.                F. E. WOLCOTT                1,983,210
                         ELECTRIC COFFEE MAKER
                         Filed Jan. 15, 1932            2 Sheets—Sheet 1

INVENTOR
FRANK E. WOLCOTT
BY
ATTORNEY

Dec. 4, 1934.     F. E. WOLCOTT     1,983,210
ELECTRIC COFFEE MAKER
Filed Jan. 15, 1932     2 Sheets-Sheet 2
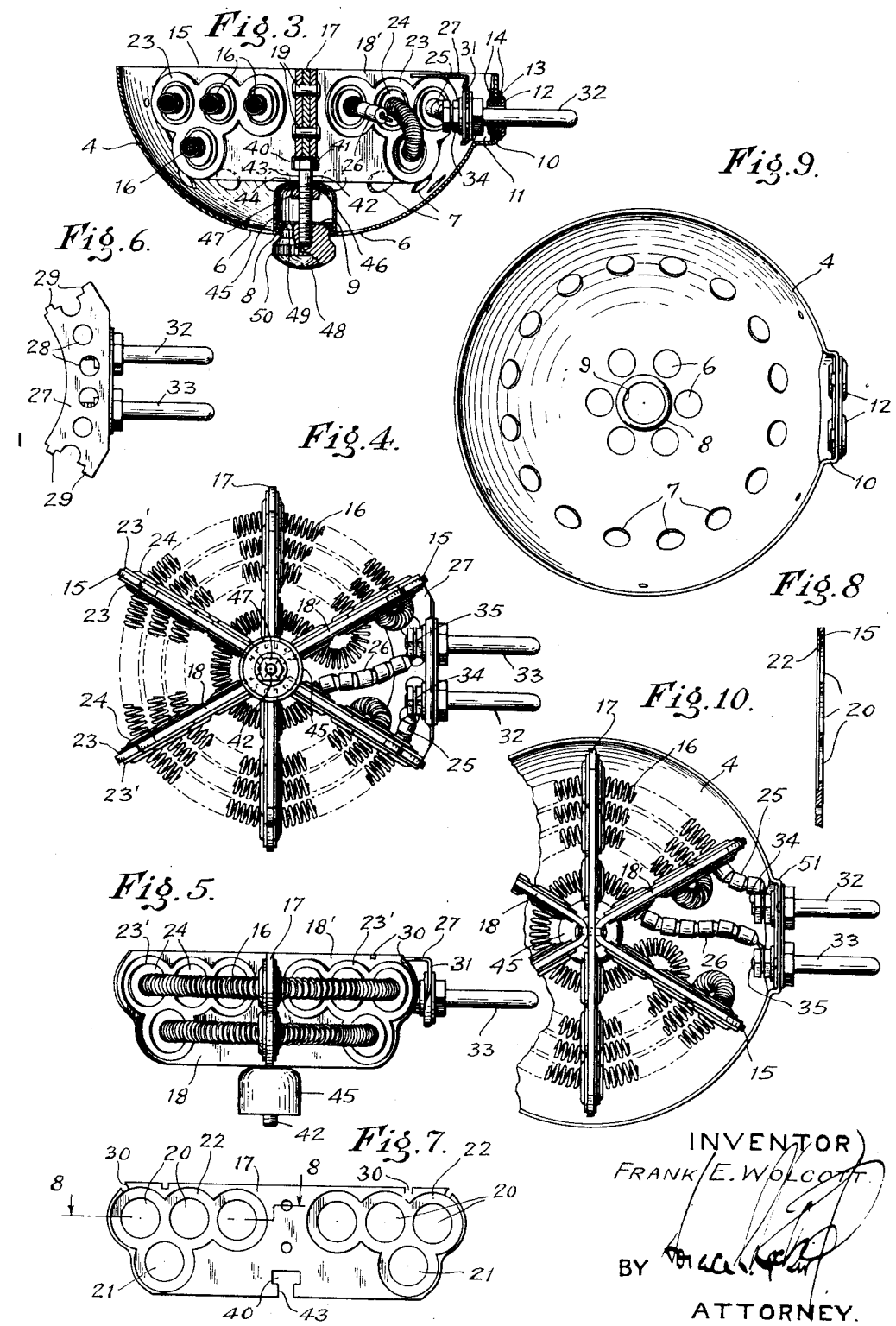

Patented Dec. 4, 1934

1,983,210

UNITED STATES PATENT OFFICE 1,983,210

ELECTRIC COFFEE MAKER

Frank E. Wolcott, West Hartford, Conn., assignor to The Silex Company, a corporation of Connecticut Application January 15, 1932, Serial No. 586,811

39 Claims. (Cl. 219—43)

My invention relates to electric coffee makers.

It has among its objects to provide an improved electric coffee maker, and, more particularly, an improved coffee maker of the quick cooling vacuum type having improved lower bowl supporting and heating and cooling means whereby it is made possible to increase the heating and cooling capacity and also to simplify and improve the structure, while making the latter more rugged and extending the possible field of use of such coffee makers. A further object of my invention is to provide an improved lower bowl supporting and heating and cooling means of a type adapted quickly to direct a large quantity of heat rays of high temperature upon the bottom of the lower bowl of such a coffee maker, and which is also adapted to be quickly cooled upon cutting off of the current, all in such manner as to expedite the delivery of the water in the lower bowl to the coffee in the upper bowl and to expedite the return of the brewed coffee from the upper bowl to the lower bowl within the limits of a normal infusion period. A still further object is to provide an improved electric heating means adapted to be housed in a reflector bowl such as is ordinarily used in such coffee makers, which is of an improved construction minimizing the dark area on the reflector bowl, while being of a strong and rugged construction adapted to withstand abuse in service and also to permit the same to support the lower bowl directly thereon if desired, and all while also being adapted to be very quickly and conveniently assembled in or removed from the reflector bowl whenever desired. These and other objects and advantages of my improved construction will, however, hereinafter more fully appear.

In the accompanying drawings I have shown for purposes of illustration two embodiments which my invention may assume in practice.

In these drawings,—

Fig. 3 is a vertical sectional view through the reflector bowl and unit, the view being on line 3—3 of Fig. 2;

Fig. 4 is a bottom plan view of the unit removed from the bowl;

Fig. 5 is a side elevation of the unit shown in Fig. 4;

Fig. 6 is a detail plan view of the terminal plug carrying unit removed from the heating unit;

Fig. 7 is a detail side elevation of one of the resistance carrying members in the unit;

Fig. 8 is a detail sectional view on line 8—8 of Fig. 7;

Fig. 9 is a top plan view of the reflector bowl, the unit being removed therefrom, and Fig. 10 is a partial plan view of a modified construction, the unit being shown disposed in the bowl.

Figure 1:
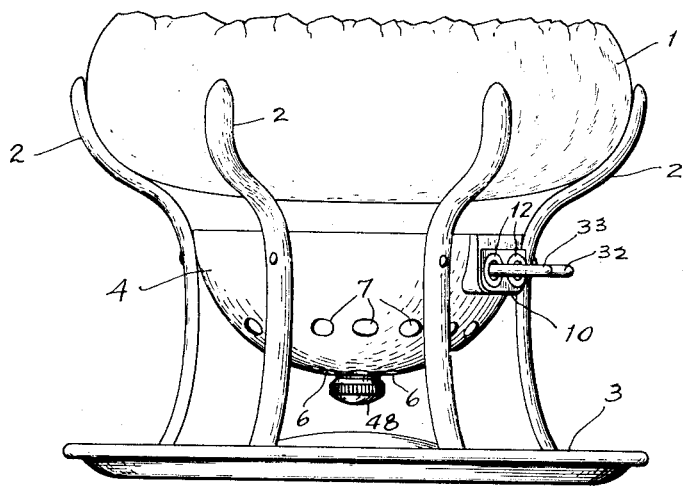
Figure 1 is a side elevation of the lower part of my improved coffee maker, the upper bowl being omitted and a portion of the lower bowl being broken away to facilitate illustration.
Figure 1A:
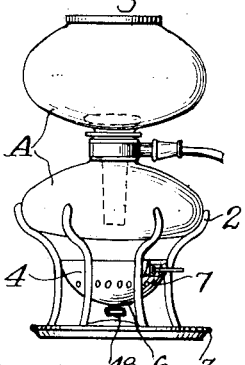
Figure 1a is a side elevation on a small scale of a complete coffee maker constructed in accordance with my improvement.
Figure 2:
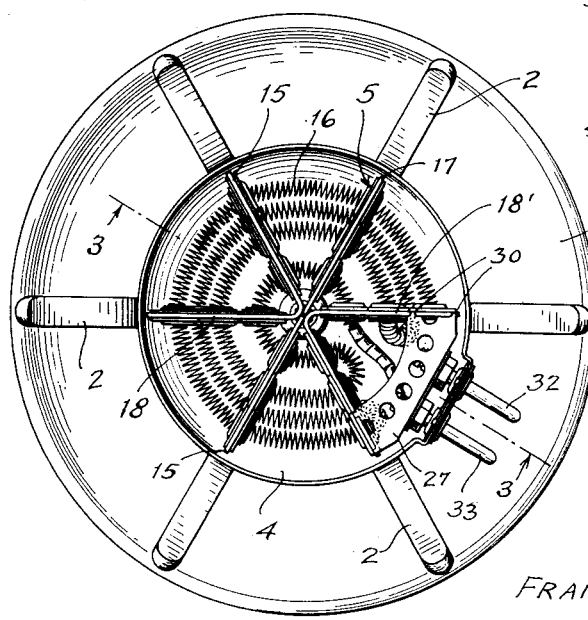
Fig. 2 is a top plan view of the heater stand, the lower bowl being removed.

In the construction shown in Figure 1a, it will be noted that I have shown my improved construction cooperating with a usual vacuum type coffee maker, generally indicated at A, and having the usual operatively connected upper coffee or infusing and lower water bowls, while in Figures 1 to 9 I have illustrated the same only in connection with the lower coffee maker bowl 1, the latter being supported on upstanding radially disposed supports 2, in turn carried by a tray 3 and carrying between the same and beneath the lower bowl 1, a reflector bowl 4 which houses my improved combined grid and heating means, generally indicated at 5, and is itself improved, all as hereinafter more fully described.

The bowl 4 in my present construction is not only provided with a series of apertures 6 in its bottom around and closely adjacent its axis, but is also provided with another series of apertures 7 spaced above the apertures 6, which apertures 7 materially increase the possible flow of air through the heating unit during both the heating and the cooling thereof. Attention is also directed to the fact that in this construction the bowl 4 is provided with an upturned flange 8 surrounding its axis and having an enlarged aperture 9 therein adapted to co-operate with improved connecting means for the unit as hereinafter more fully described in connection with the latter. It will also be observed that the bowl 4 is provided at one side with an outwardly and upwardly directed protruding portion 10 which forms a chamber 11 for the terminal connections which are likewise hereinafter described, and also carries a plurality of spaced eyelets or rivets 12 extending through suitable apertures 13 in the upstanding wall of the portion 10 and insulated from that wall by suitable insulation 14.

Within the top of this improved bowl 4, my improved unit 5 is supported in an improved manner, as shown in Figure 3, preferably with its bottom slightly above the bottoms of the apertures 7 and with improved supporting means, hereinafter described, associated with the flange 8, and improved terminal connections having terminal plugs extending through the insulated eyelets 12, all as hereinafter more fully described.

Referring to the unit 5, it will be noted that the same herein has a metal frame of spider form, and comprising a plurality of vertically and radially disposed arms 15 projecting outward from a common axis and each carrying a series of coils of an electric resistance wire 16 suitably insulated from the arms and electrically connected at its opposite ends to suitable terminals hereinafter described. More particularly, the spider frame comprises one straight frame member 17 and a pair of oppositely disposed V-shaped frame members 18, 18' each connected at its apex to the member 17 substantially midway between the ends of the latter by any suitable connecting means, herein in the form of rivets 19, while the members 17, 18, 18' are each in the form of a vertically disposed thin flat plate. Moreover, it will be noted that each of the arms 15, whether on the member 17 or the members 18, 18', has a series of apertures 20, herein three, all disposed in the same plane adjacent but spaced below the top of the arm, and also a single aperture 21 disposed below and between the two outermost apertures 20, while the end of each arm is also suitably rounded or cut away on the wider side of its end to permit it to be readily received in or removed from the bowl 4 as hereinafter described. As shown, a shallow recess 22 is also provided on one side of each arm which extends around all of these apertures, while a single piece of insulation 23, such for example as mica, is located in this recess 22. Moreover, a corresponding mica member 23 is disposed on an opposite unrecessed face of the arm, and rivets or eyelets 24 are passed through the apertures 20 and 21 and corresponding apertures in the mica members 23 in such manner as to fasten the mica members to the arms while providing an aperture through the rivet for the resistance wire 16.

Referring more particularly to the wire 16 and its arrangement, it will be noted that the same herein is of a usual coiled type and that it extends continuously through all of the insulated eyelets 24 in such manner as to form one continuous resistance element of large capacity having a plurality of coils disposed on an upper level, and the remainder disposed on a lower level. While various arrangements may be used, I preferably have the ends of the resistance wire 16 connected to the same arm 15 of the member 18', herein shown at the right in Fig. 2, above the terminals, and in Fig. 4, below the terminals, and connect bead covered terminal wires 25 and 26 to the opposite ends of the resistance wire 16 so that the latter may be connected thereby to the terminal plugs, hereinafter described. While the resistance wire may also be strung in various ways, I preferably have the coil extend from the selected arm 15 around the unit in the outermost set of openings 20 to the other arm of that member 18', and then pass the resistance wire down through the aperture 21 in that arm and around the unit again through the other openings 21. Then it is directed upward through the middle aperture 21 and extends around the unit again in these until it again emerges from the other arm, from which it is then directed around the unit in the innermost series of apertures 21 to complete the stringing of the unit.

Attention is here also directed to the improved terminal plug carrying connections provided on the unit 5. These herein are carried on the arms 15 of the member 18' adjacent the connections 25, 26. As shown, they include an arcuate terminal carrying plate 27 which has a series of perforations 28 therein for a purpose hereinafter described, and is also provided with lugs 29 on its ends adapted to be forced into corresponding notches 30 in the upper edges of the arms 15 of the member 18', as shown, to rigidly connect the member 27 to the latter member. As shown, the member 27 is also provided with a depending straight chord-like flange portion 31 on its outer edge through which the terminal plugs 32 and 33 extend while being suitably insulated therefrom, usual binding screws 34 and 35 being provided on the inner ends of these terminal plugs to enable the connection thereto of the connections 25, 26.

Improved supporting and connecting means are also provided herein for mounting my improved unit 5 in the reflector bowl 4. Herein, these means include a rectangular aperture 40 in the member 17 and a corresponding communicating aperture in the apex of each of the members 18 and 18'. In the combined aperture thus formed when the several members are assembled as shown, the head of a threaded bolt 41 is disposed, while the threaded shank 42 of the bolt extends down through smaller apertures 43 in the members 17, 18 and 18' communicating with the apertures 40 and leading toward the bottom of the unit. On this bolt and below the bottom of the unit, a washer 44 is preferably disposed, and below this washer an inverted cup shaped member 45 is also disposed, the same herein being held in position by a washer 46 and a nut 47 on the threaded shank 42 and both disposed inside the member 45. The lower end of this member 45 also leads around the extension 8 which is disposed around the axis of the member 4, while the threaded shank 42 extends through the enlarged opening 9 in that extension. Thus, when a suitable knob or nut 48 is threaded on the extremity of the shank 42 and tightened, the parts will be effectually clamped together. Attention is also directed to the fact that herein the member 48 is provided with a reduced inner end 49 which is adapted to be received within the underside of the extension 8 and abut against the same in such manner as to provide an effective holding means, while the member 48 is also provided with a knurled edge 50 making the same readily adjustable.

As a result of my improved construction it will be noted that the unit is readily assembled in or removed from the bowl 4. In assembling the parts, the terminal plugs 32 and 33 being a part of the unit 5 and the ends of the arms 15 being rounded or cut away on their undersides as described, it will be evident that, with the unit as a whole disposed above the bowl and angled with its plugs 32 and 33 extending downward and pointed toward the eyelet 12, the unit may first be moved laterally to cause these plugs to pass through the eyelets 12, and then lowered about these eyelets into its desired position in the bowl 4. With the threaded member 42 and the member 45 in position on the unit, when the same is thus lowered, it will also be noted that the member 45 will center the unit on the extension 8, while the lower extremity of the member 42 will pass down through the opening 9 in the extension 8 and project below the bottom of the bowl. Thus, by simply threading the member 48 on this extremity until its portion 49 seats against the under surface of the extension 8, the parts may be very readily clamped together. Similarly, whenever it is desired to remove the unit for any reason, the member 48 being removed, the unit 5 may be lifted in such manner as to angle its terminal plugs 32 and 33 and permit their ready withdrawal laterally when the bottom of the unit clears the top edge of the bowl.

In the operation of my improved construction it will be evident that when suitable connections are made to the plugs 32, 33, a very substantial amount of heat will be radiated from the resistance element 16. Further, it will be evident that through the arrangement of the resistance element relative to the arms 15, each portion of the coiled resistance wire will be so disposed as to make the resistance element most effective. More particularly, the coiled resistance wire is so disposed that no coiled portion of the same overlies any other coiled portion, while all of the coiled portions and the arms 15 are so disposed relative to the reflector bowl as to minimize the dark area on the bowl and thus insure a maximum amount of heat reflection by the latter. Through the use of the spider construction, a minimum of heat is absorbed by the resistance support and the latter is also adapted to cool very quickly. Attention is also directed to the fact that the resistance element and the apertures 6 and 7 in the bowl 4 are arranged so that a free flow of air is permitted and an effective upward draft of hot air over the bottom of the bowl 1 is accordingly produced as soon as the current is turned on. Also, it will be evident that this draft will act when the current is turned off, to cool the bowl 1, its support 2, and all parts of the heating unit, including the bowl 4, spider and resistance wire, very quickly, and thus, despite the very high heat, effect the automatic return of the brewed coffee from the upper bowl to the lower bowl within the limits of a normal infusion period and while the latter bowl still remains upon the supports 2. Here attention is also directed to the fact that through the apertures 28 provided in the terminal plug carrying plate 27, the air is also permitted to pass up through this plate in such manner as to minimize heating and expedite cooling of the terminals. Moreover, it will be noted that, due to the spacing of the coils of the resistance wire from one another and the spacing of the coils passing through the outermost openings 20 and the opening 21 from the inner surface of the bowl 4, such excess heating of the bowl as would result in discoloration of the same is prevented.

Attention is also directed to the fact that, through the location of the uppermost coils of the resistance wire 16 below the tops of the arms 15 and the improved spider construction provided, the resistance wire is quite effectually protected against injury by the grid thus formed, while this same construction also permits the article to be heated to be seated directly upon this grid, if desired, and also permits the elimination of the upper bowl supporting fingers 2. Moreover, a combined bowl and grid unit of the type corresponding generally to the bowl 4 and grid 5 hereof, see Figure 3, lends itself especially to use in lieu of the bowl and special quick cooling bowl support therein fixed to the bowl and separate from and above a cylindrical refractory heating unit of smaller diameter than the bowl, described in my earlier application Serial No. 498,053, wherein I eliminated such fingers as the fingers 2 spaced above the bowl and effected a vertical nesting of the lower coffee maker bowl in the heater bowl while continuing to obtain quick cooling. Here it will also be noted that my present combined bowl and grid unit mentioned, also eliminates need for a grid attached in the bowl above the resistance, my improved grid 5 both carrying the resistance and providing the grid, while reducing the heat absorptive material, producing effective distribution of the heat, and being adapted to receive the coffee maker bowl directly thereon, all in such manner as to produce more satisfactory results and produce an exceedingly rugged structure remarkably free from troubles when even submitted to the rough usage incident to restaurant service or the like. This construction also constitutes an effective protection for the coils during handling of the unit in course of manufacture. Moreover, it will be noted that with the resistance wire disposed as herein, and located, as it is, above the various apertures 6 and 7 in the bowl 4, even if liquid should be spilled onto the heating unit, no serious difficulty can occur. Of course, it will also be obvious that if it is desired at any time to clean the heating unit or the bowl, the heating unit may be readily removed to permit such cleaning, whenever desired. These and other advantages of my improved construction will, however, be clearly apparent to those skilled in the art.

In Figure 10 I have illustrated a modified construction which, while not preferred, may be used if desired. In this construction the unit is the same as heretofore described, save that instead of the terminal plugs 32, 33 being carried on the unit, these plugs are mounted upon a portion 51 formed on the bowl 4 and corresponding to the portion 10, but slightly smaller than the latter. Here it will be understood that the plugs 32 and 33 are rigidly connected to this portion 51 and suitably insulated therefrom in a well known manner, and that the leads 25, 26 of the resistance unit are also connected to the binding posts 34, 35 for the plugs in a usual way. As in this construction during the assembly or removal of the unit, it is necessary to connect or disconnect the binding screws 34, 35, as well as to connect or disconnect the member 48, this construction is not preferred, although it may be used if desired.

While I have in this application specifically described two embodiments which my invention may assume in practice, it will be understood that the same are shown for purposes of illustration only, and that the invention is not limited thereto but may be modified and embodied in various other forms without departing from its spirit or the scope of the appended claims.

What I claim as new and desire to secure by Letters Patent is:—

1. In a coffee maker, a bowl, heater carrying skeleton grid forming means distributed over and disposed in said bowl, and resistance means carried by said grid forming means below the grid surface thereof.

2. In a coffee maker, a reflector bowl, quick cooling combined heater carrying grid forming means in the top of said bowl, and a series of heating coils insulated from an article on said means and carried by said means below the grid surface thereof.

3. In a coffee maker, a bowl, quick cooling grid forming means in said bowl, communicating aperture forming means in said last mentioned means and the bowl bottom, and a resistance element on said grid forming means insulated from an article thereon and below the grid surface thereof.

4. In a coffee maker, a bowl, a spider grid in said bowl, and a series of heating coils strung on said spider insulated from an article thereon and below the grid surface of said spider.

5. In a coffee maker, a bowl, a spider grid disposed in said bowl having radially disposed grid arms, and a series of heating coils insulated from and extending through said arms below the grid surface thereof.

6. In a coffee maker, a bowl, a spider grid disposed in said bowl having radially disposed grid arms, insulated aperture forming means in said arms, and a series of heating coils extending through said means below the grid surface of said arms.

7. In a coffee maker, a bowl, a spider grid disposed in said bowl having radially disposed grid arms, and a series of heating coils insulated from and supported by said arms below the grid surface thereof and in non-overlying relation.

8. In a coffee maker, a bowl, a spider grid disposed in said bowl having radially disposed grid arms, and a series of heating coils insulated from and supported by said arms below the grid surface thereof and in different planes and in non-overlying relation.

9. In a coffee maker, a bowl, quick cooling grid forming means therein, a resistance element on said means below the grid surface thereof, and means for effecting a free flow of heating or cooling air through said bowl and elements therein.

10. In a coffee maker, a bowl, a grid therein distributed over the top thereof, a series of heating coils on said grid below the grid surface thereof and distributed over the top of said bowl and carried therein having air circulating means extending therethrough, and circulation inducing means comprising a series of openings in said bowl below said grid.

11. In a coffee maker, a bowl, a grid therein distributed over the top thereof, a series of heating coils on said grid below the grid surface thereof and distributed over the top of said bowl and carried therein having air circulating means extending therethrough, and circulation inducing means comprising a series of openings in said bowl above the bottom of said bowl and a second series of openings in the bottom of said bowl.

12. In combination, a bowl, a combined heating and grid unit disposed in said bowl having heating means on said unit below the grid thereof and carrying rigidly connected terminal plugs projecting laterally therefrom between the top and bottom thereof and removable bodily therewith, and means for supporting said unit in said bowl.

13. In a coffee maker, a bowl having terminal aperture means therein in the side thereof, a combined resistance carrying grid unit carrying rigidly connected terminal plugs disposed in the plane of said unit insertable or removable laterally through said means as said unit is disposed in said bowl, and axial means for supporting said unit in said bowl.

14. In a coffee maker, a bowl, a grid in said bowl having in said bowl a quick cooling article support and heating coils carried by the latter distributed over substantially the cross section of said bowl, and means for effecting a free flow of air upwardly through said grid and laterally in said bowl beneath the grid surface.

15. In a coffee maker, a bowl, a heating grid forming unit therein, a depending member having its upper end seated in said grid unit below the grid surface thereof, and means on the lower end of said member for positioning said unit and connecting said member to said bowl.

16. In a coffee maker, a bowl, a heating unit therein, a depending member beneath said unit, and means for connecting said member to said bowl comprising unit supporting and clamping members inside and outside said bowl engaging opposite sides of the bowl bottom and adjustable on said depending member.

17. In a coffee maker, a bowl, a heating unit in said bowl and also carrying a depending member, and co-operating supporting and clamping means comprising a raised portion on said bowl and co-operating supporting and clamping members engageable therewith and carried on said member and inside and outside said bowl.

18. In a coffee maker, a bowl, a heating unit in said bowl, a connecting member depending from the axis of said unit, and unit supporting and clamping means on said unit and bowl including a cupid member adjustably carried by said connecting member inside said bowl, and a removable clamping member on said connecting member outside said bowl.

19. In a heating unit, a spider grid having radially disposed grid forming arms having free communication with the atmosphere therebetween and above the same, and a resistance wire strung thereon and disposed below the grid surface thereof.

20. In a heating unit, a spider grid having radially disposed grid forming metal arms having free communication with the atmosphere therebetween and above the same, insulating means in said arms below the grid forming surface thereof, and resistance means carried by said insulating means below said surface.

21. In a heating unit, a spider grid having radially disposed grid forming arms having free communication with the atmosphere therebetween and above the same, a resistance element strung thereon below the grid surface thereof, means for insulating said element from said arms, and terminal plugs rigidly connected to certain of said arms and electrically connected to said element.

22. In a heating unit, a spider grid having radially disposed grid forming arms, a resistance element strung thereon below the grid surface thereof, means for insulating said element from said arms, and terminal plugs rigidly connected to certain of said arms and electrically connected to said element and projecting laterally from the periphery of said unit between the top and bottom thereof.

23. In a heating unit, a spider grid having radially disposed arms presenting free extremities, a resistance wire strung on said arms and having both of its extremities accessible between adjacent arms on said spider, and a terminal plug carrying member supported by the extremities of said adjacent arms of said spider.

24. In a heating unit, a grid comprising a series of thin metal arms disposed vertically having free communication with the atmosphere therebetween and above the same, insulating aperture forming means disposed in said arms between the top and bottom thereof, and a coiled resistance element strung through said aperture forming means and insulated thereby from said arms.

25. In a heating unit, a grid comprising a series of thin metal arms disposed vertically having free communication with the atmosphere therebetween and above the same, insulating aperture forming means disposed in said arms between the top and bottom thereof, and a coiled resistance element strung through said aperture forming means and insulated thereby from said arms, said resistance element being so disposed as to leave an unobstructed space between an adjacent pair of said arms.

26. In a heating unit, a grid comprising a series of thin metal arms disposed vertically having free communication with the atmosphere therebetween and above the same, insulating aperture forming means disposed in said arms between the top and bottom thereof, and a coiled resistance element strung through said aperture forming means and insulated thereby from said arms, said resistance element being so disposed as to leave an unobstructed space between an adjacent pair of said arms, and terminal plug carrying means carried between said last mentioned arms and connected to said resistance element.

27. In a heating unit, a spider comprising a straight member and co-operating V-shaped members having their apexes intermediate the ends of said straight member and on opposite sides thereof, transverse means between the parts of said V-shaped members and extending through said straight member for connecting the same together, and resistance means supported on the radial arms thus provided.

28. In a heating unit, a spider comprising a straight member and co-operating V-shaped members having their apexes intermediate the ends of said straight member and on opposite sides thereof, transverse rivet means connecting said members, insulated eyelets disposed in the radial arms thus provided, and resistance means in said eyelets.

29. In a heating unit, a spider comprising a straight member and co-operating V-shaped members connected thereto at their apexes intermediate the ends of said straight member and on opposite sides thereof, means forming a socket below the connection of said members, and a depending connecting member having its upper end carried in said socket at the junction of said members.

30. In a coffee maker, quick cooling bowl supporting means, a bowl housing the same, electric heating means in said bowl having a heating element distributed in a horizontal zone substantially over the area of said bowl, and means for effecting a circulation of heating or cooling air up through said elements upon a bowl supported on said bowl supporting means.

31. In a coffee maker, quick cooling bowl supporting grid means, a bowl housing the same, electric heating means in said bowl having a heating element distributed in a horizontal zone substantially over the area of said bowl, and means permitting an unobstructed lateral flow of air between the top of said bowl supporting grid means and said heating elements.

32. In a coffee maker, upstanding bowl supporting fingers forming a bowl seat at their upper ends, a heater bowl spaced below said seat, quick cooling electric heating means in said bowl having a heating element distributed in a horizontal zone substantially over the area of said bowl, and means for effecting a circulation of heating or cooling air up through said elements upon a bowl carried on said seat.

33. An electric stove having a bowl in the top thereof, a heating unit having a resistance element distributed over the top of said bowl and having in said bowl a quick cooling resistance element support and air passage means leading through said support, upstanding means providing an article support above and closely adjacent said heating unit having free lateral communication with the atmosphere between said unit and an article on said article support, and air passage means leading through said bowl and through said quick cooling support and communicating laterally with the atmosphere beneath an article on said article support.

34. In a coffee maker, a bowl, quick cooling bowl supporting means exposing the bottom thereof and having free lateral communication with the atmosphere below said bottom, a heater carrying bowl spaced below said bowl bottom, a quick cooling resistance unit comprising a quick cooling support in the top of said heater carrying bowl and of substantially the diameter thereof and having resistance means thereon distributed over substantially the whole area of the top of the latter bowl and air circulating means through said support, and circulation means comprising a series of openings leading through said heater carrying bowl communicating through said support with the space below the bottom of said first mentioned bowl.

35. In a coffee maker, a bowl, combined quick cooling grid and heater carrying means disposed in said bowl having spaced grid forming members distributed over said bowl and having on said members means for supporting a coffee maker bowl directly thereon and withstanding breakage due to bowl impacts, and a series of heating coils insulated from an article on said members and carried by the latter below the grid surface thereof.

36. In a coffee maker, a bowl, combined quick cooling grid and heater carrying means disposed in said bowl having vertically disposed grid forming members distributed over said bowl and having on said members means for supporting a coffee maker bowl directly thereon and withstanding breakage due to bowl impacts, a series of resistance coils insulated from an article on said members and carried by the latter below the grid surface thereof, and communicating aperture forming means in said grid means and said bowl for effecting an induced free air flow on an article on said grid forming members during and following current flow through said coils.

37. In a coffee maker, bowl supporting grid means for supporting a water bowl including spaced grid forming members having free communication vertically and laterally with the atmosphere, a bowl housing said grid means therein, and electric resistance means in said last mentioned bowl having a heating element carried by said grid members below the grid surface thereof and distributed in a horizontal zone substantially over the area of said bowl, said bowl supporting grid means, bowl, and resistance means being quick cooling and cooperating to provide means for automatically effecting upon cessation of current flow through said resistance means, a normal infusion in a vacuum type coffee maker bowl supported on said grid means.

38. In combination with a vacuum type coffee maker having operatively connected upper infusion and lower water bowls, and means for supporting said lower bowl during heating and also cooling the latter upon cessation of heating within the limits of a normal infusion period to terminate infusion in the infusion bowl while said lower bowl is supported on said supporting means, including a bowl disposed beneath said lower bowl, and a combined resistance carrying and grid forming unit in said bowl distributed over substantially the whole area of said last mentioned bowl and having grid forming members and resistance means carried thereon and disposed below the grid surface thereof.

39. In combination with a vacuum type coffee maker having operatively connected upper infusion and lower water bowls, and means for supporting said lower bowl during heating and also cooling the latter upon cessation of heating within the limits of a normal infusion period to terminate infusion in the infusion bowl while said lower bowl is supported on said supporting means, including a bowl disposed beneath said lower bowl, and a combined resistance carrying and grid forming unit in said bowl distributed over substantially the whole area of said last mentioned bowl and having grid forming members and resistance means carried thereon and disposed below the grid surface thereof, said bowl and combined unit having communicating air flow passage forming means through said grid and unit housing bowl and said grid and resistance means and delivering an induced air flow therethrough upon the bottom of said lower bowl.

FRANK E. WOLCOTT.